US010122243B2

(12) United States Patent
Hirai et al.

(10) Patent No.: US 10,122,243 B2
(45) Date of Patent: Nov. 6, 2018

(54) ROTATING ELECTRIC MACHINE WITH A COOLING STRUCTURE

(71) Applicant: KABUSHIKI KAISHA TOYOTA JIDOSHOKKI, Kariya-shi, Aichi-ken (JP)

(72) Inventors: Yuzo Hirai, Aichi-ken (JP); Tomohiro Kosaki, Aichi-ken (JP); Tsutomu Imai, Toyoda-cho (JP)

(73) Assignee: KABUSHIKI KAISHA TOYOTA JIDOSHOKKI, Kariya-shi, Aichi-ken (JP)

(*) Notice: Subject to any disclaimer, the term of this patent is extended or adjusted under 35 U.S.C. 154(b) by 355 days.

(21) Appl. No.: 14/827,661

(22) Filed: Aug. 17, 2015

(65) Prior Publication Data

US 2016/0056690 A1 Feb. 25, 2016

(30) Foreign Application Priority Data

Aug. 20, 2014 (JP) ................... 2014-167332

(51) Int. Cl.
*H02K 9/06* (2006.01)
*H02K 5/20* (2006.01)
(Continued)

(52) U.S. Cl.
CPC ............ *H02K 9/06* (2013.01); *H02K 5/161* (2013.01); *H02K 5/20* (2013.01); *H02K 7/116* (2013.01); *H02K 11/21* (2016.01); *H02K 11/22* (2016.01)

(58) Field of Classification Search
CPC .......... H02K 9/06; H02K 11/21; H02K 11/22; H02K 5/161; H02K 5/20; H02K 7/116
(Continued)

(56) References Cited

U.S. PATENT DOCUMENTS 7,462,964 B2* 12/2008 Nagayama ............ H02K 9/14
310/58
7,723,875 B2* 5/2010 Fakes ..................... H02K 5/20
310/58
(Continued)

FOREIGN PATENT DOCUMENTS

JP    2001-238403 A    8/2001
JP    2009-284736 A    12/2009
JP    2013-110841 A    6/2013

OTHER PUBLICATIONS

Communication dated Mar. 1, 2016 from the European Patent Office in counterpart application No. 15181205.4.

*Primary Examiner* — Bernard Rojas
(74) *Attorney, Agent, or Firm* — Sughrue Mion, PLLC

(57) ABSTRACT

The rotating electric machine includes a housing, a pair of bearings that is fixed by the housing, a shaft supported at opposite ends thereof by the respective bearings, a rotor mounted on the shaft for rotation therewith, and a stator disposed in such a manner as to surround the rotor. A rotational speed detection gear is mounted on the shaft for rotation therewith at a position between the rotor and one of the bearings and in a vicinity of the bearing, and the rotational speed detection gear has a plurality of gear teeth at an outer circumference thereof. A rotational speed detector is provided at a position in the housing so as to face the gear teeth of the rotational speed detection gear. A rotating member for generating a flow of air is disposed in the housing.

2 Claims, 6 Drawing Sheets

(51) Int. Cl.
    *H02K 5/16*     (2006.01)
    *H02K 7/116*     (2006.01)
    *H02K 11/22*     (2016.01)
    *H02K 11/21*     (2016.01)

(58) Field of Classification Search
    USPC .................................. 310/60 A, 68 B, 83, 99
    See application file for complete search history.

(56) References Cited

U.S. PATENT DOCUMENTS

| | | |
|---|---|---|
| 2001/0017498 A1 | 8/2001 | Matsuoka et al. |
| 2009/0028730 A1* | 1/2009 | Radermacher ...... F04D 29/4206 417/423.8 |
| 2011/0109176 A1* | 5/2011 | Yoshimura ............... H02K 5/20 310/64 |
| 2012/0212086 A1 | 8/2012 | Nagayama et al. |
| 2013/0127303 A1 | 5/2013 | Matsumoto |
| 2013/0334934 A1* | 12/2013 | Maeda ............... H02K 11/0073 310/68 B |

* cited by examiner

ROTATING ELECTRIC MACHINE WITH A COOLING STRUCTURE

BACKGROUND OF THE INVENTION

The present invention relates to a rotating electric machine.

In some industrial vehicles such as forklift trucks including a rotating electric machine (e.g. a motor) as a power source for traction, the right drive wheel and the left drive wheel are driven by separate rotating electric machines. In such industrial vehicles, the right drive wheel is connected to the output shaft of the right rotating electric machine and the left drive wheel is connected to the output shaft of the left rotating electric machine, which enables a small-sized simplified structure that provides a desired drive force and a smaller turning radius. In each of the rotating electric machines, the output shaft that is provided on the side opposite to the output shaft connected to the drive wheels may be connected with a device such as a brake device. For this reason, left drive wheel, left rotating electric machine, left brake device, right brake device, right rotating electric machine, and right drive wheel are disposed serially in this order from the left drive wheel side toward the right drive wheel side. Thus, the length of a rotating electric machine in the axial direction thereof should preferably be as small as possible. Rotating electric machines used as a drive source for an industrial vehicle, for example, generate a large amount of heat. Therefore, the rotating electric machine for such industrial vehicle should preferably have a small, simplified cooling structure that utilizes air for cooling and more preferably should be equipped with a rotational speed detection gear having gear teeth for detecting a rotational speed of the rotating electric machine.

Japanese Unexamined Patent Application Publication No. 2013-110841 discloses a cooling structure for a brushless motor including a motor housing and a shaft (a motor shaft) supported at the opposite ends thereof through bearings in the motor housing, and a cooling fan that is provided outside the motor housing and sends air from one end toward the opposite end of the shaft along the axial direction thereof. The cooling structure further includes a cylindrical stator having a plurality of teeth provided in the circumferential direction thereof and a plurality of ventilation grooves is provided in an insulating member covering an end surface of the stator that is on the side opposite to the cooling fan at positions between any two adjacent teeth.

Japanese Unexamined Patent Application Publication No. 2001-238403 discloses an electric motor including a housing (an outer casing), a shaft (a rotating shaft) that is supported at the opposite ends thereof through a bearing in the housing. The housing has in peripheral walls thereof and at a position adjacent to one end of the shaft an air intake port and at a position adjacent to the other end of the shaft an air outlet port. A main plate is provided between a rotor and the other end of the shaft. The main plate has a conical surface extending to the air outlet port along the axial direction of the shaft and includes a plurality of fan blades on the conical surface. The shaft has at the other end thereof a rotating disc for a sensor (corresponding to the aforementioned rotational speed detection gear) that detects the rotating speed of the shaft. The housing has a speed sensor at a position of the housing facing the outer peripheral surface of the rotating disc for the sensor.

In the cooling structure for a brushless motor disclosed in Japanese Unexamined Patent Application Publication No. 2013-110841 wherein the cooling fan that is larger than the stator is mounted on the shaft outside the motor housing, the length of the motor in the axial direction thereof is increased by the dimension of the cooling fan. Furthermore, if a rotational speed detection gear is added to the cooling structure, the length of the motor in the axial direction is further increased.

As with the cooling structure of Japanese Unexamined Patent Application Publication No. 2013-110841, in the electric motor disclosed in Japanese Unexamined Patent Application Publication No. 2001-238403 wherein the conical main plate having fan blades is mounted on the shaft, the length of the electric motor in the axial direction is increased by the dimension of the main plate. Furthermore, the electric motor has the rotating disc for a sensor (corresponding to the above-described rotational speed detection gear) at the other end of the shaft and, therefore, the length of the electric motor in the axial direction is further increased.

The present invention has been made in view of the above problems and is directed to providing a rotating electric machine having a rotating member for air cooling and a rotation speed detection gear that can reduce the dimension of the rotating electric machine in the axial direction thereof and provides an appropriate path for cooling air.

SUMMARY OF THE INVENTION

The present invention is directed to providing a rotating electric machine that solves the above problems. In accordance with an aspect of the present invention, the rotating electric machine includes a housing, a pair of bearings that is fixed by the housing, a shaft that is supported at opposite ends thereof by the respective bearings, a rotor that is mounted on the shaft for rotation therewith, and a stator that is fixed by the housing and disposed in such a manner as to surround the rotor. A rotational speed detection gear is mounted on the shaft for rotation therewith at a position between the rotor and one of the bearings and in a vicinity of the bearing, and the rotational speed detection gear has a plurality of gear teeth at an outer circumference thereof. A rotational speed detector is provided at a position in the housing so as to face the gear teeth of the rotational speed detection gear. A rotating member for generating a flow of air is disposed in the housing. The housing includes a cylindrical peripheral wall and opposite end walls. One of the end walls is a gear-side end wall that is adjacent to the rotational speed detection gear, and the gear-side end wall has at a position adjacent to the shaft an air intake port that provides communication between inside and outside of the housing. A recess is formed in the gear-side end wall extending radially outward from the air intake port to form an air intake passage. An air outlet port is provided in the cylindrical peripheral wall of the housing between the gear-side end wall and the stator to provide communication between the inside and the outside of the housing. The rotational speed detection gear is disposed on the way of an air path extending from the air intake port to the rotating member along an axis of the shaft. A hole is formed through the rotational speed detection gear along the axis of the shaft.

Other aspects and advantages of the invention will become apparent from the following description, taken in conjunction with the accompanying drawings, illustrating by way of example the principles of the invention.

DETAILED DESCRIPTION OF THE EMBODIMENTS

The following will describe embodiments for carrying out the present invention with reference to the accompanying drawings. In each of the drawings, the X-, Y-, and Z-axes are orthogonal to one another and the X-axis represents the axial direction of the shaft of the rotating electric machine.

Figure 10:
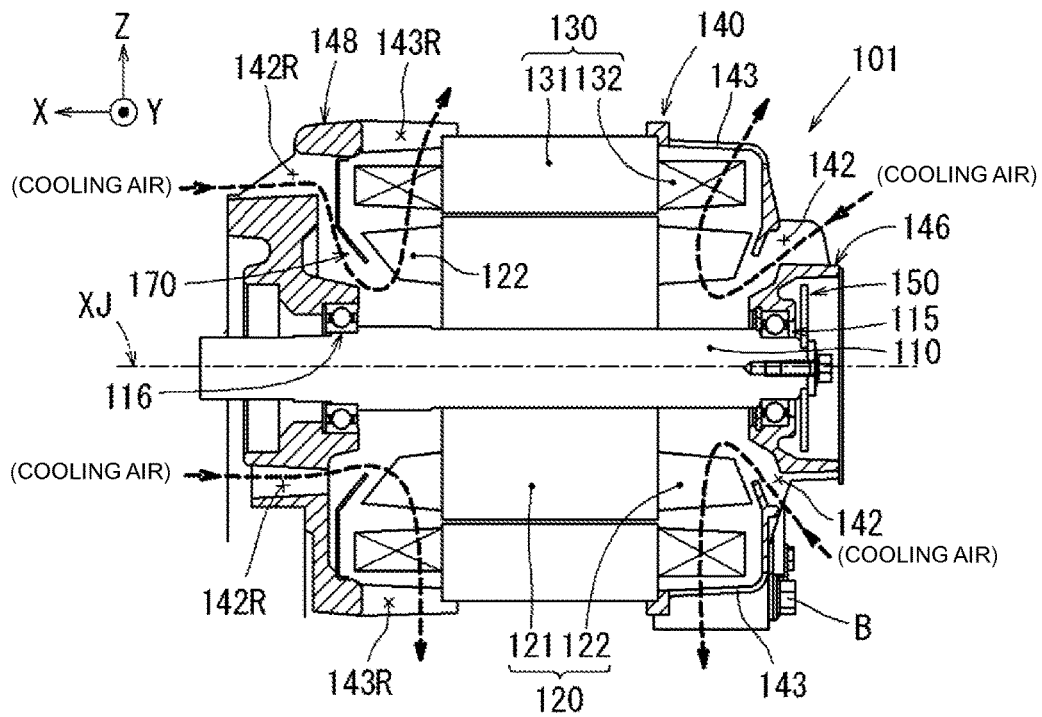
FIG. 10 is a longitudinal cross-sectional view showing a rotating electric machine according to the background art and flow of the cooling air.
Figure 11:
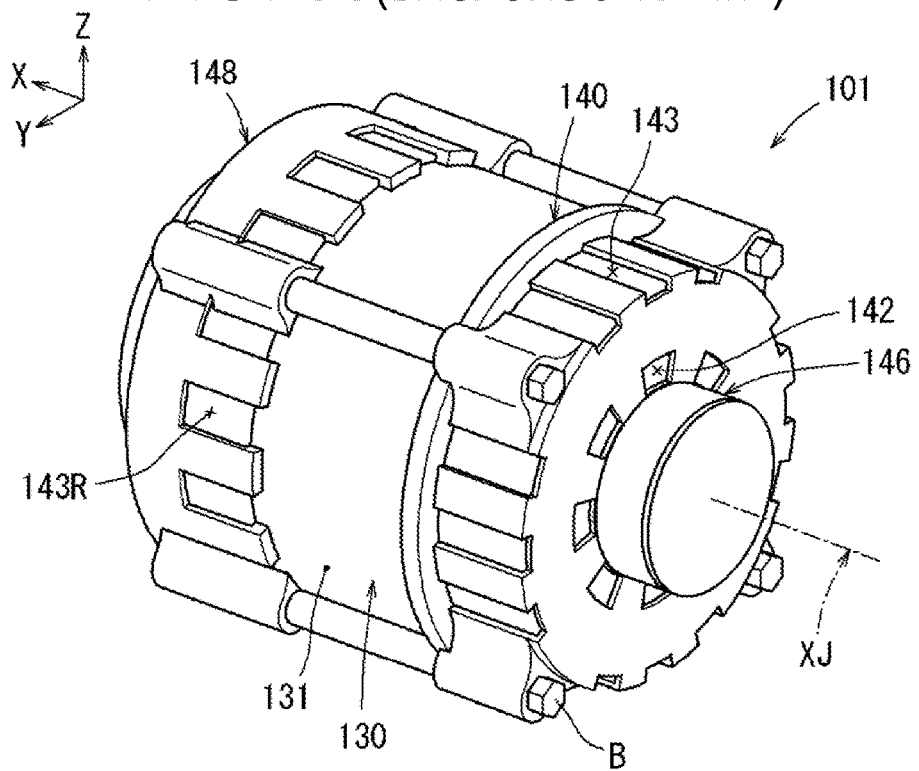
FIG. 11 is a perspective view of the rotating electric machine of FIG. 10.

Internal Configuration and Appearance of Rotating Electric Machine 101 in Background Art (FIGS. 10 and 11)

A rotating electric machine 101 in the background art will now be described with reference to FIGS. 10 and 11. FIG. 10 shows a longitudinal cross section of the rotating electric machine 101. FIG. 11 is a perspective view of the rotating electric machine 101. The rotating electric machine 101 in the background art includes a shaft 110 that is supported at one end thereof by a bearing 115 and the other end thereof by a bearing 116. A rotational speed detection gear 150 is mounted on the shaft 110 at a position axially outward of the bearing 115. The rotating electric machine 101 is configured such that a plurality of air intake ports 142 is formed through an end wall of a housing 140 on the rotational speed detection gear 150 side, and air (cooling air) is introduced from the air intake ports 142 and discharged through an air outlet port 143 that is formed through the cylindrical peripheral wall of the housing 140.

As shown in FIG. 10, the rotating electric machine 101 in the background art includes the shaft 110, the bearing 115, the bearing 116, a rotor 120, a stator 130, the housing 140, and a housing 148. The shaft 110 is supported at the both ends thereof through the bearings 115, 116, respectively. The rotor 120 is fixed on the shaft 110 for rotation therewith.

The rotor 120 includes a rotor core 121 and a fin 122. A magnet is embedded in the rotor core 121. The fin 122 generates a flow of air. The stator 130 has in the periphery thereof a plurality of stator teeth 131 and a plurality of coils 132. Each coil 132 generates a rotating magnetic field for rotating the rotor 120 with the current supplied from a drive circuit (not shown). As shown in FIGS. 10 and 11, the bearing 115 and the stator 130 are fixed to the housing 140, the bearing 116 and the stator 130 are fixed to the housing 148, and the housing 140 and the housing 148 are connected together by bolts B.

The housing 148 has substantially a cylindrical shape having a cylindrical peripheral wall and an end wall. The end wall has therethrough a plurality of air intake ports 142R and the cylindrical surface has therethrough a plurality of air outlet ports 143R. An air guide 170 is mounted in the housing 148 to provide an appropriate path for air. As depicted by dashed arrows in FIG. 10, air is introduced into the housing 148 through the air intake ports 142R while being guided by the air guide 170. The air flows past the fin 122 and flows through the air outlet ports 143R while cooling mainly the coils 132.

The housing 140 has substantially a cylindrical shape having a cylindrical peripheral wall and an end wall. The end wall has therethrough a plurality of air intake ports 142 and the peripheral cylindrical surface has therethrough a plurality of air outlet ports 143. As depicted by dashed arrows in FIG. 10, air is introduced into the housing 140 through the air intake ports 142, flows past the fin 122, and flows out through the air outlet ports 143 while cooling mainly the coils 132.

The rotational speed detection gear 150 having a plurality of gear teeth is substantially disc-shaped and fixed to one end of the shaft 110 in the housing 140. Description is omitted as to the rotational speed detector that is provided at a position facing the gear teeth of the rotational speed detection gear 150. The rotational speed detection gear 150 is mounted on the one end of the shaft 110 at a position axially outward of the end wall of the housing 140. The housing 140 has a cylindrical projection 146 extending in the axial direction of the shaft 110 in such a manner as to surround the rotational speed detection gear 150.

In the rotating electric machine 101, the projection 146 surrounding the rotational speed detection gear 150 is formed projecting axially from the end wall of the housing 140 on the rotational speed detection gear 150 side. The presence of the projection 146 is not preferable since such projection may interfere with devices such as a brake device mounted on the end wall having such projection. Furthermore, because the rotational speed detection gear 150 and the projection 146 both extend in the axial direction, the dimension of the rotating electric machine 101 in the axial direction is unfavorably increased. According to a rotating electric machine 1 of an embodiment of the present invention, which will be described in detail below, the housing of the rotating electric machine 1 dispenses with a projection extending from the end wall of the housing in an axial direction (i.e. the projection of the housing) thereby to permit the installation of a brake device or the like to the end wall of the housing. Furthermore, the rotating electric machine 1 may be made smaller in the axial direction than that of the rotating electric machine 101 of the background art while maintaining the cooling performance of the rotating electric machine 101.

Internal Configuration and Appearance of the Rotating Electric Machine 1 According to the Present Invention (FIGS. 1 to 7)

Figure 1:
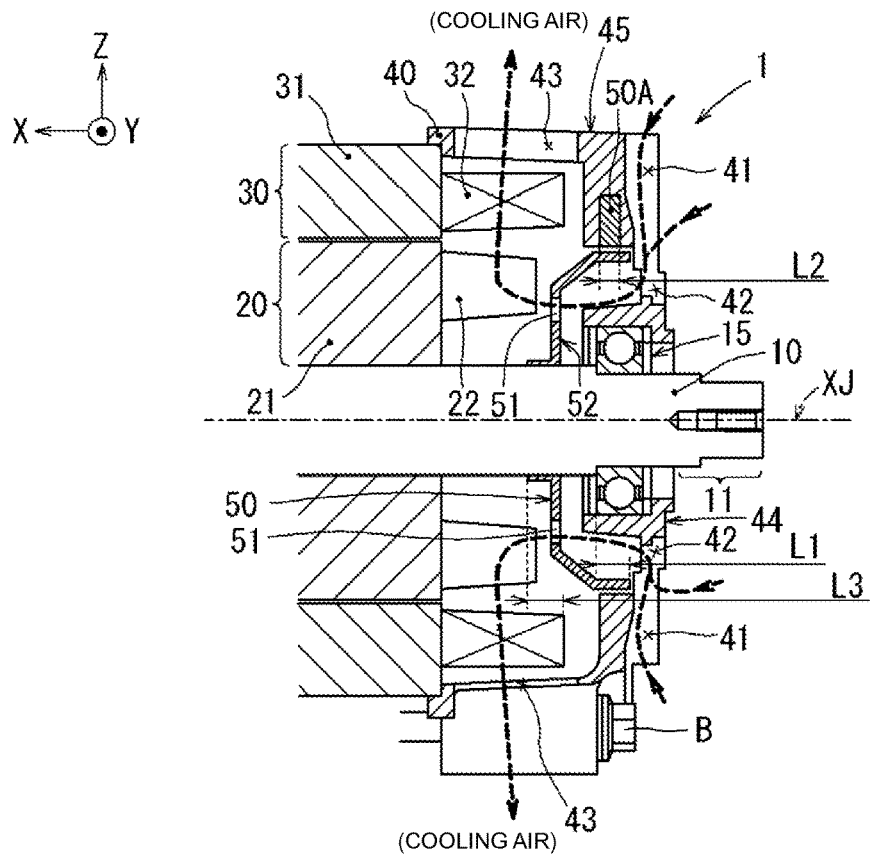
FIG. 1 is a cross-sectional fragmentary view of a rotating electric machine according to an embodiment of the present invention, showing a housing of the rotating electric machine housing therein a rotational speed detection gear and the vicinities of the housing and also flow of cooling air flowing in the housing.
Figure 2:
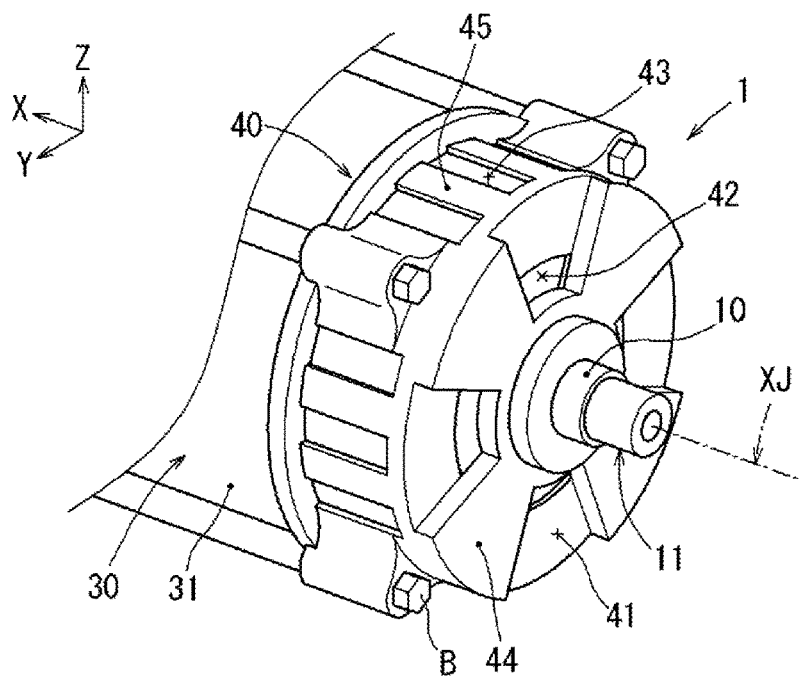
FIG. 2 is a perspective view showing the housing of the part of the rotating electric machine of FIG. 1.
Figure 5:
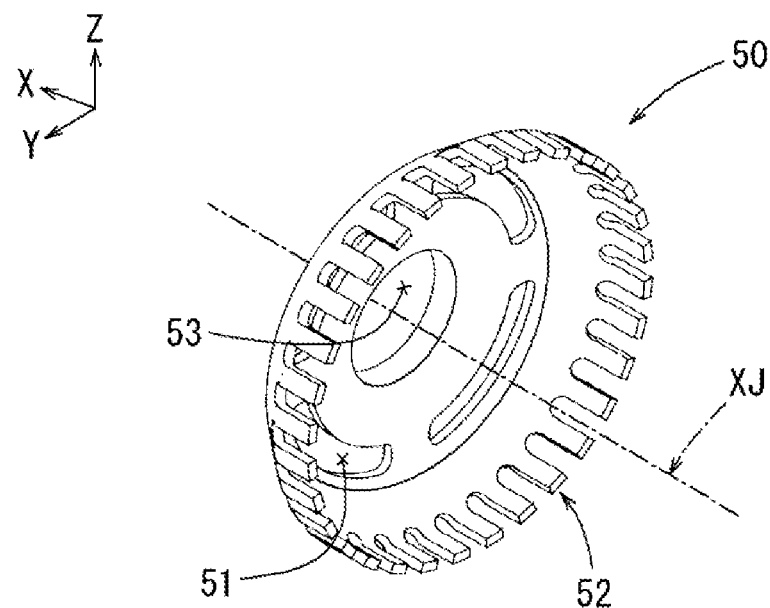
FIG. 5 is a perspective view of the rotational speed detection gear of FIG. 3.
Figure 6:
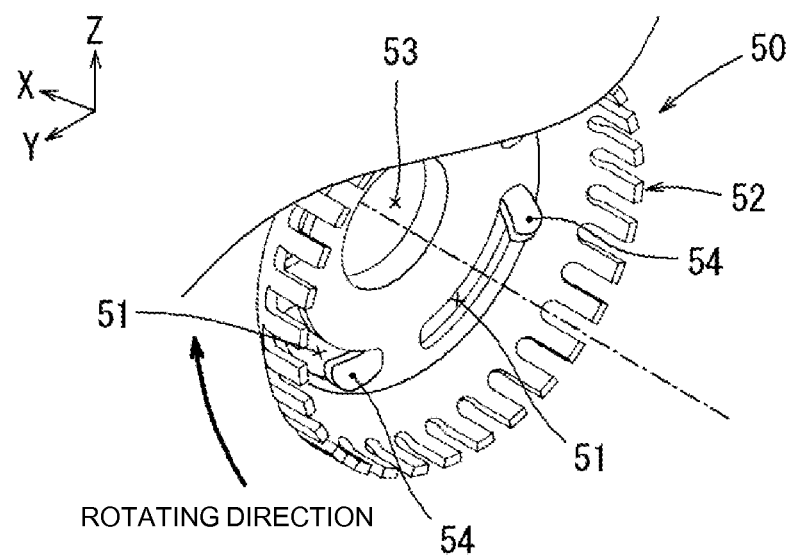
FIG. 6 is a perspective view showing an example of the rotational speed detection gear wherein an air flow generator is provided around a hole formed through the rotational speed detection gear.
Figure 7:
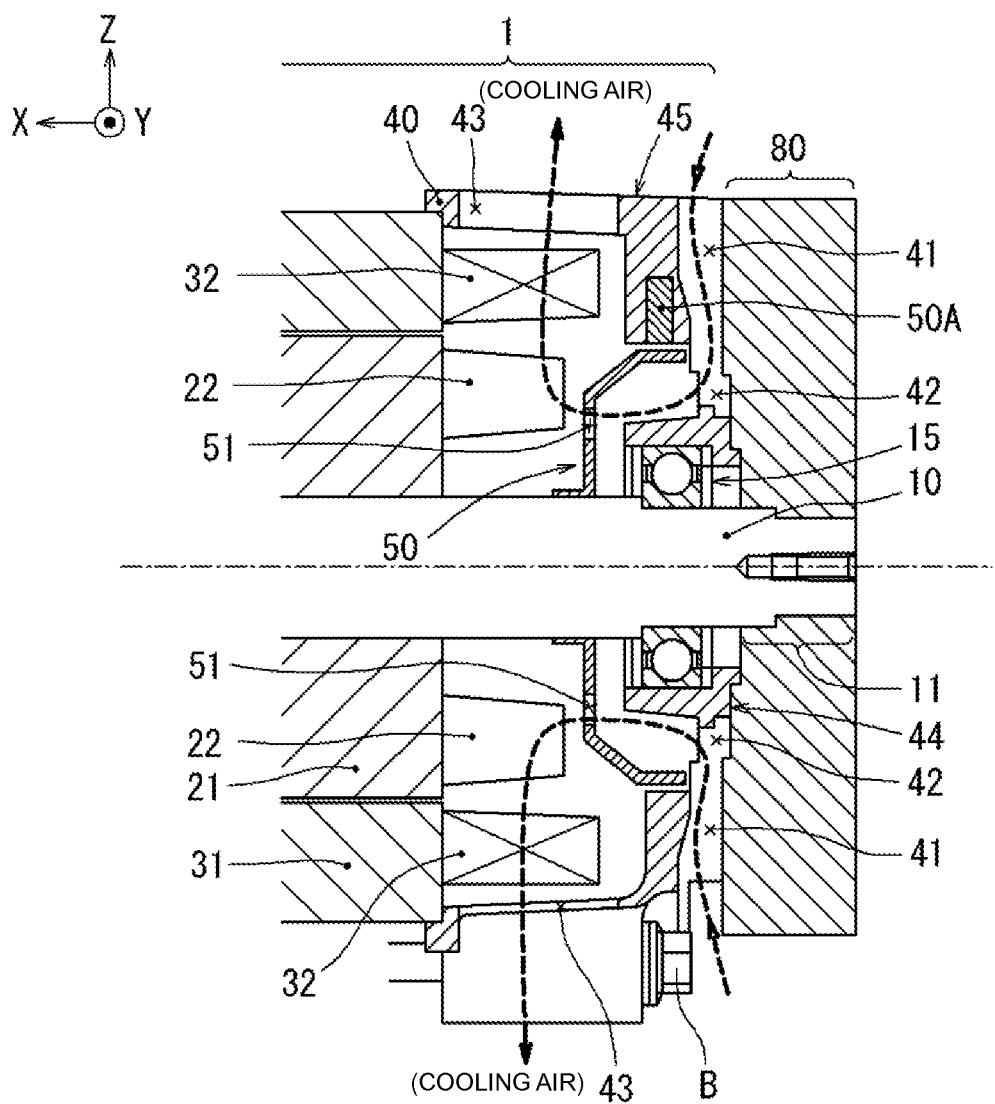
FIG. 7 is a cross-sectional view similar to FIG. 1 showing a state in which a brake device is mounted at an end of the shaft and also flow of the cooling air flowing in the housing.

The following will describe the rotating electric machine 1 according to an embodiment of the present invention with reference to FIGS. 1 to 6. It is to be noted that in the following description of the embodiment, an air-cooled squirrel-cage induction motor that is useable as a traction power source for an industrial vehicle, such as a forklift truck, is used as an example. FIG. 1 is a longitudinal cross-sectional fragmentary view of the rotating electric machine 1 according to the embodiment, specifically showing a part of a housing 40 in which a rotational speed detection gear 50 is disposed. FIG. 2 is a perspective view showing the part of the housing 40 of the rotating electric machine 1 shown in FIG. 1. FIGS. 3 to 6 are various views showing the rotational speed detection gear 50. FIG. 7 shows an example of the rotating electric machine 1 having on an end wall 44 thereof a brake device 80.

The arrangement and the shape of the rotational speed detection gear 50 and the shape of the end wall 44 of the housing 40 of the rotating electric machine 1 according to the present embodiment are different from those of the rotating electric machine 101 of the background art (see FIG. 10). These differences make it possible that the rotating electric machine 1 of the present embodiment is shorter in the axial dimension than the rotating electric machine 101 of the background art (see FIG. 10). Furthermore, the end wall 44 of the housing 40 is formed flat, and therefore, it is possible to mount a brake device 80 or the like to the end wall 44 of the housing, as shown in FIG. 7.

As shown in FIG. 1, the rotating electric machine 1 includes a shaft 10, a bearing 15, a rotor 20, a stator 30, and a housing 40. It is to be noted that, in FIGS. 1 and 2, the vicinities of the housing 40 of the rotating electric machine 1 in which the rotational detection gear 50 is disposed are illustrated and other parts of the rotating electric machine 1 are omitted from the illustration.

The opposite ends of the shaft 10 are rotatably supported by bearings. According to the present embodiment shown in FIG. 1, one end of the shaft 10 is supported by the bearing 15. It is to be noted that, although not shown in FIG. 1, the other end of the shaft 10 is also supported by a bearing.

The rotor 20 includes a rotor core 21 and a plurality of fins 22 as the rotating member of the present invention. The rotor 20 is formed, for example, by laminating disc-shaped steel sheets in the direction of an axis of the shaft 10 (or the direction that is parallel to an axis of rotation XJ of the shaft 10) and then inserting a permanent magnet into a hollow part of the rotor core 21 formed in the direction of the axis of the shaft 10. The fins 22 are disposed in a circumferential direction, extending from the opposite sides of the substantially cylindrical rotor core 21, thereby forming a so-called a multiblade fan. Rotation of the rotor 20 generates a flow of air (cooling air) flowing radially outward (i.e. from the fins 22 toward air outlet ports 43). The rotor 20 is mounted on the shaft 10 for rotation therewith.

The stator 30 includes a plurality of stator teeth 31 that are disposed in a circumferential direction and a plurality of coils 32 wound around each of the stator teeth 31. For example, the stator teeth 31 are formed by laminating in the direction of the axis of the shaft 10 a plurality of annular steel sheets each having teeth projecting radially inward. Current is supplied to each of the coils 32 at specified intervals from a drive circuit (not shown). The stator 30 then generates a rotating magnetic field for rotating the rotor 20. The fins 22 are formed with a length as measured along the X-axis that is shorter than the length of the respective coils 32 as measured along the X-axis. With the fins 22 having a length that is shorter than the length of the coils 32 along the X-axis, it is possible to mount a fan as a rotating member on the shaft 10 at a position radially inward of the coils 32.

The housing 40 is provided at one end of the rotating electric machine 1 in the axial direction thereof and the stator 30 and the bearing 15 are fixed to the housing 40. The housing 40 is connected to another housing (not shown) disposed at the other end of the rotating electric machine 1 by bolts B. The housing 40 is substantially cylindrical and has a cylindrical peripheral wall 45 and an end wall 44. The end wall 44 corresponds to the gear-side end wall of the present invention. A plurality of air intake ports 42 is provided at positions in the end wall 44 of the housing 40 that are adjacent to and around the shaft 10. The air intake ports 42 provide communication between the inside and the outside of the housing 40. A plurality of recessed air intake passages 41 is formed in the end wall 44 of the housing 40 extending radially outward from the air intake ports 42. A plurality of air outlet ports 43 is provided circumferentially around the housing 40 at positions in the cylindrical peripheral wall 45 between the end wall 44 of the housing 40 and the stator 30. The air outlet ports 43 provide communication between the inside and the outside of the housing 40.

Figure 3:
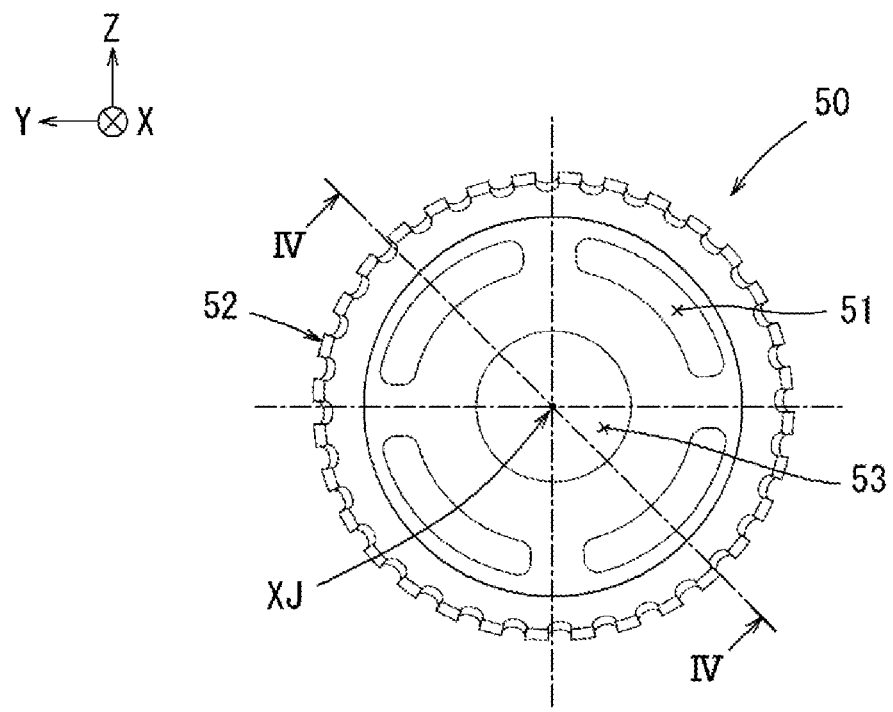
FIG. 3 is a front view of the rotational speed detection gear of the rotating electric machine of FIG. 1.
Figure 4:
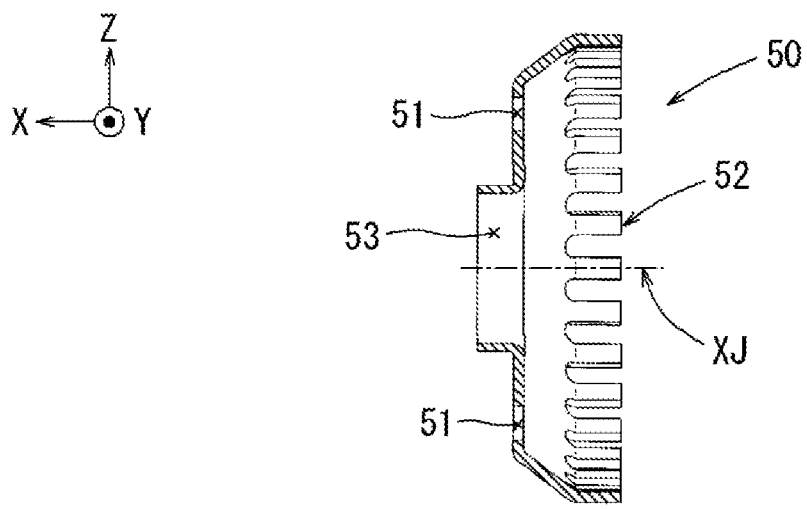
FIG. 4 is a cross-sectional side view of the rotational speed detection gear taken along line IV-IV in FIG. 3.

As shown in FIG. 1, the rotational speed detection gear 50 is mounted (or press-fitted) on the shaft 10 for rotation therewith at a position between the bearing 15 and the rotor 20 and in the vicinity of the bearing 15. The bearing 15 corresponds to one of the bearings of the present invention. Referring to FIGS. 3 to 5, the rotational speed detection gear 50 has along the rim thereof a plurality of gear teeth 52 and in the center thereof a shaft insertion hole 53 through which the shaft 10 is passed. The rotational speed detection gear 50 has a shape of a cup that is recessed facing the bearing 15 (see FIGS. 1, 4, and 5). Referring back to FIG. 1, a rotational speed detector 50A (e.g. a rotation detection sensor) is provided at a position in the housing 40 so as to face the gear teeth 52. As shown in FIGS. 1, 3, 4, and 5, a plurality of holes 51 is formed through the rotational speed detection gear 50 around the shaft insertion hole 53.

As shown in FIG. 1, the rotational speed detection gear 50 and the bearing 15 are disposed so that at least a part of the rotational speed detection gear 50 and at least a part of the bearing 15 overlap with each other over a distance L1 in the direction of the axis of the shaft 10. Furthermore, the rotational speed detection gear 50 and the rotational speed detector 50A are disposed so that at least a part of the rotational speed detection gear 50 and at least a part of the rotational speed detector 50A overlap with each other over a distance L2 in the direction of the axis of the shaft 10. Additionally, the rotational speed detection gear 50 and the stator 30 are disposed so that at least a part of the rotational speed detection gear 50 and at least a part of the coils 32 of the stator 30 overlap with each other over a distance L3 in the direction of the axis of the shaft 10. In such arrangement of the rotational speed detection gear 50, the bearing 15 and the rotational speed detector 50A, the bearing 15 is disposed most radially inward, the rotational speed detection gear 50 is disposed radially outward of the bearing 15 in such a manner as to surround a part of the outer periphery of the bearing 15, the rotational speed detector 50A is disposed over a part of the outer periphery of the rotational speed detection gear 50, and the coils 32 of the stator 30 are disposed in such a manner as to surround a part of the rotational speed detection gear 50. In this way the cup-shaped rotational speed detection gear 50 that is disposed properly in the limited space of the rotating electric machine 1 enables the arrangement above and the axial length of the rotating electric machine 1 is further reduced.

Furthermore, as indicated by the dashed arrows in FIG. 1, the air that is introduced through the air intake ports 42 with the rotation of the fins 22 flows to the fins 22 along the axis of rotation of the shaft 10 and flows further toward the air outlet ports 43 thereby to cool mainly the coils 32. The rotational speed detection gear 50 is disposed in a path between the air intake ports 42 and the fins 22 and therefore, the rotational speed detection gear 50 may interfere with the path for the air. However, the provision of the holes 51 through the rotational speed detection gear 50 allows the air to flow from the air intake ports 42 toward the respective fins 22. Furthermore, the cup-shaped rotational speed detection gear 50 serves as an air guide and appropriately leads the air introduced through the air intake ports 42 toward the respective holes 51. It is to be noted that, as shown in FIG. 6, air flow generators 54 (e.g. fins) may be provided in the vicinity of the respective holes 51 formed through the rotational speed detection gear 50 so that air is introduced from the bearing 15 side and discharged through the side thereof opposite to the bearing 15, when the rotational speed detection gear 50 is rotated in a predetermined direction (the arrow direction shown in FIG. 6). Such provision of the air flow generators 54 allows the air to flow more efficiently from the air intake ports 42 to the rotating member.

As shown in FIG. 2, except the recessed air intake passages 41, the end wall 44 of the housing 40 is formed flat, so that a brake device 80 and the like can be installed easily to the housing 40, as shown in FIG. 7. FIG. 7 shows an example of the rotating electric machine 1 in which the shaft 10 has a projection 11 on which the brake device 80 is fixed. Bolts and nuts or snap rings for fixing the brake device 80 in to the end wall 44 of the housing 40 are not illustrated in FIG. 7. It is to be noted that in the example according to the present embodiment, the shaft 10 is formed with the projection 11 that is used for fixing the brake device 80 to the end wall 44. As a matter of course, the shaft 10 may dispense with the projection 11, as required.

Because the air intake passages 41 are recessed in the end wall 44 of the housing 40, as shown in FIG. 7, paths for intake air are ensured between the air intake passages 41 and the air intake ports 42 with the brake device 80 or the like installed on the end wall 44 of the housing 40. With the brake device 80 thus installed, therefore, paths for air are formed that permit the air to flow through the air intake passages 41, the air intake ports 42, the holes 51 of the rotational speed detection gear 50, the fins 22, and the air outlet ports 43 in this order.

Figure 8:
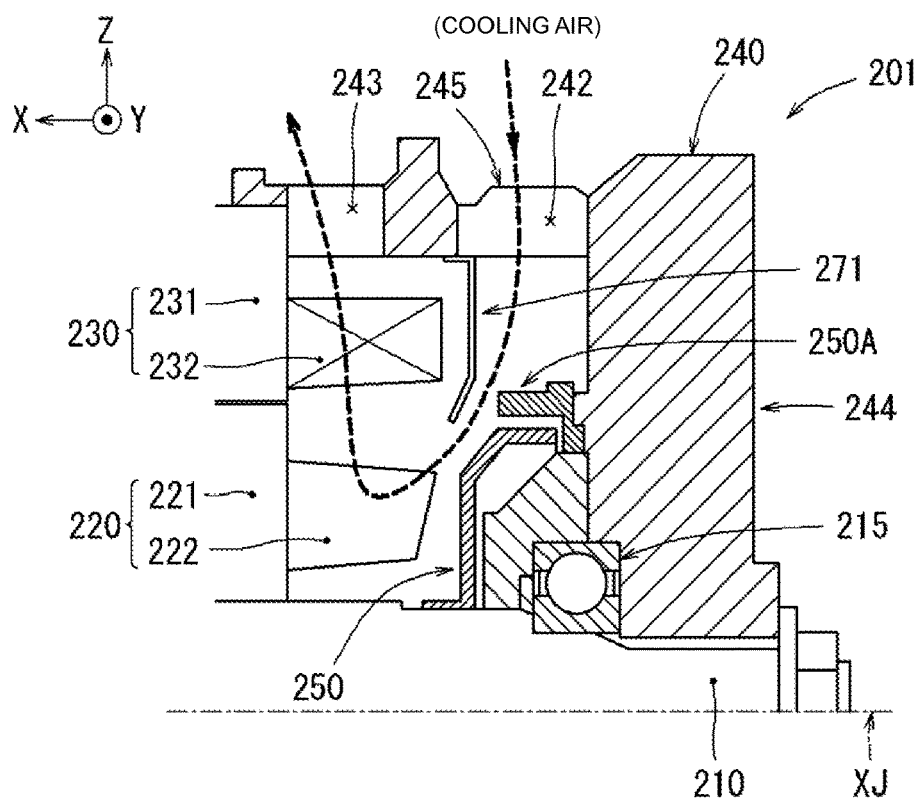
FIG. 8 is a partially enlarged cross-sectional view schematically showing an example of the rotating electric machine in which an air intake port is provided in a cylindrical peripheral wall of the housing.
Figure 9:
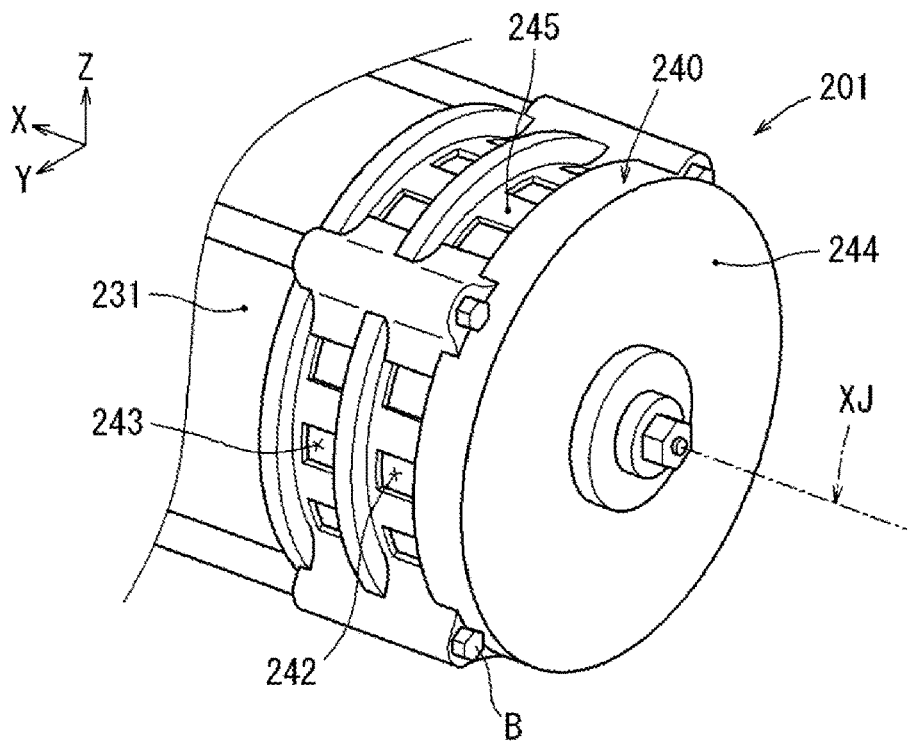
FIG. 9 is a perspective view corresponding to the part of the rotating electric machine shown in FIG. 8.

Referring to FIGS. 8 and 9, there is shown a rotating electric machine 201 having a configuration that permits installation of a brake device and the like on an end 244 of a housing 240. In the configuration shown in FIGS. 8 and 9, however, air intake ports 242 are provided through a cylindrical peripheral wall 245 of the housing 240, so that air outlet ports 243 and the air intake ports 242 are arranged in the axial direction of a shaft 210, which unfavorably increases the length of the rotating electric machine 201 in the direction of the axis of the shaft 10. Furthermore, in the configuration in which the air outlet ports 243 and the air intake ports 242 formed through the cylindrical peripheral wall 245 of the housing 240 and arranged close to each other in the axial direction, an air guide 271 needs to be provided for forming a path for air, which increases the number of components and hence the number of man-hours for assembling work. In contrast to this, in the rotating electric machine 1 that has been described with reference to FIGS. 1 through 7, the rotating member that circulates air is disposed in the housing 40 and the air intake ports 42 are provided in the end wall 44 of the housing 40. Therefore, the axial length of the rotating electric machine 1 may be further reduced and no further additional parts such as an air guide is required. In addition, with the brake device 80 or the like installed to the end wall 44 of the housing 40, no blockage of the air intake ports 42 occurs by virtue of the provision of the air intake passages 41 and a desired cooling capacity is ensured.

The rotating electric machine 1 according to the present invention is not limited to the configuration, structure, shape, etc. described with reference to the present embodiment, and various modifications, additions, or deletions may be possible within the gist of the present invention.

The rotating electric machine 1 in the present embodiment is an example of a rotating electric machine for use in a traction power source of an industrial vehicle. However, the rotating electric machine 1 may be used for various applications, such as a motive power for various purposes, or serving as a generator.

According to the present embodiment, the rotational speed detection gear 50 is recessed facing the bearing 15. However, the shape of the rotational speed detection gear 50 may be flat disc shaped.

What is claimed is:

1. A rotating electric machine comprising:
   a housing;
   a pair of bearings that is fixed by the housing;
   a shaft that is supported at opposite ends thereof by the respective bearings;
   a rotor that is mounted on the shaft for rotation therewith; and
   a stator that is fixed by the housing and disposed in such a manner as to surround the rotor, wherein
   a rotational speed detection gear is mounted on the shaft for rotation therewith at a position between the rotor and one of the bearings and in a vicinity of the bearing, and the rotational speed detection gear has a plurality of gear teeth at an outer circumference thereof,
   a rotational speed detector is provided at a position in the housing so as to face the gear teeth of the rotational speed detection gear,
   a rotating member for generating a flow of air is disposed in the housing,
   the housing includes a cylindrical peripheral wall and opposite end walls,
   one of the end walls is a gear-side end wall that is adjacent to the rotational speed detection gear, and the gear-side end wall has at a position adjacent to the shaft an air intake port that provides communication between inside and outside of the housing,
   a recess is formed in the gear-side end wall, the recess extending radially outward to an outer periphery of the end wall from the air intake port to form an air intake passage,
   an air outlet port is provided in the cylindrical peripheral wall of the housing between the gear-side end wall and the stator to provide communication between the inside and the outside of the housing,
   the rotational speed detection gear is disposed on the way of an air path extending from the air intake port to the rotating member along an axis of the shaft, and
   an air passage hole is formed through the rotational speed detection gear along the axis of the shaft, and
   an air flow generator is provided in the vicinity of the air passage hole of the rotational speed detection gear so that when the rotational speed detection gear is rotated in a predetermined direction, air flows from the bearing side of the rotational speed detection gear to the side thereof opposite to the bearing.

2. A rotating electric machine comprising:
   a housing;

a pair of bearings that is fixed by the housing;
a shaft that is supported at opposite ends thereof by the respective bearings;
a rotor that is mounted on the shaft for rotation therewith; and
a stator that is fixed by the housing and disposed in such a manner as to surround the rotor, wherein
a rotational speed detection gear is mounted on the shaft for rotation therewith at a position between the rotor and one of the bearings and in a vicinity of the bearing, and the rotational speed detection gear has a plurality of gear teeth at an outer circumference thereof,
a rotational speed detector is provided at a position in the housing so as to face the gear teeth of the rotational speed detection gear,
a rotating member for generating a flow of air is disposed in the housing,
the housing includes a cylindrical peripheral wall and opposite end walls,
one of the end walls is a gear-side end wall that is adjacent to the rotational speed detection gear, and the gear-side end wall has at a position adjacent to the shaft an air intake port that provides communication between inside and outside of the housing,
a recess is formed in the gear-side end wall extending radially outward from the air intake port to form an air intake passage,
an air outlet port is provided in the cylindrical peripheral wall of the housing between the gear-side end wall and the stator to provide communication between the inside and the outside of the housing,
the rotational speed detection gear is disposed on the way of an air path extending from the air intake port to the rotating member along an axis of the shaft,
a hole is formed through the rotational speed detection gear along the axis of the shaft, and
an air flow generator is provided in the vicinity of the hole of the rotational speed detection gear so that when the rotational speed detection gear is rotated in a predetermined direction, air flows from the bearing side of the rotational speed detection gear to the side thereof opposite to the bearing.

\* \* \* \* \*